United States Patent [19]

Yoshida et al.

[11] 4,329,632
[45] May 11, 1982

[54] RUNNING TRACK CONTROL APPARATUS FOR TRACKLESS MOVING BODY

[75] Inventors: Yutaka Yoshida; Ryohei Ishige; Hiroaki Yabu; Yasuo Nabeshima, all of Kudamatsu, Japan

[73] Assignee: Hitachi, Ltd., Tokyo, Japan

[21] Appl. No.: 157,157

[22] Filed: Jun. 6, 1980

[30] Foreign Application Priority Data

Jun. 15, 1979 [JP] Japan .................................. 54/74660

[51] Int. Cl.³ ............................................. G05B 19/36
[52] U.S. Cl. .................................. 318/587; 318/621; 180/68 R; 364/436
[58] Field of Search ................ 318/587, 621; 180/168, 180/98; 364/436

[56] References Cited

U.S. PATENT DOCUMENTS

| | | | |
|---|---|---|---|
| 4,003,445 | 1/1977 | Bruine | 318/587 X |
| 4,040,500 | 8/1977 | Blakeslee | 318/587 X |
| 4,247,896 | 1/1981 | Schnaibel | 180/168 X |

FOREIGN PATENT DOCUMENTS 53-39007  9/1978  Japan .

Primary Examiner—B. Dobeck
Attorney, Agent, or Firm—Craig and Antonelli

[57] ABSTRACT

An apparatus for controlling the running track of a trackless moving body comprising a guide wire, a position deviation sensor unit mounted on the trackless moving body for sensing a deviation of the position of the moving body relative to the guide wire, a steering control circuit connected to the position deviation sensor unit, and a steering drive unit connected to the steering control circuit for steering the moving body. The steering control circuit comprises a first-order lag circuit receiving the output signal from the position deviation sensor unit, a subtractor receiving the output signal from the position deviation sensor unit and the output signal from the first-order lag circuit, and a comparator receiving the output signal from the subtractor. In the steering control circuit, the output signal from the first-order lag circuit is subtracted in the subtractor from the output signal from the position deviation sensor unit so as to detect the rate of variation of position deviation during a predetermined period of time, and the subtractor output signal including the information of the rate of crane position deviation is compared in the comparator with a reference setting, so that the steering drive unit is actuated depending on the result of comparison for causing approaching movement of the moving body toward the guide wire.

3 Claims, 14 Drawing Figures

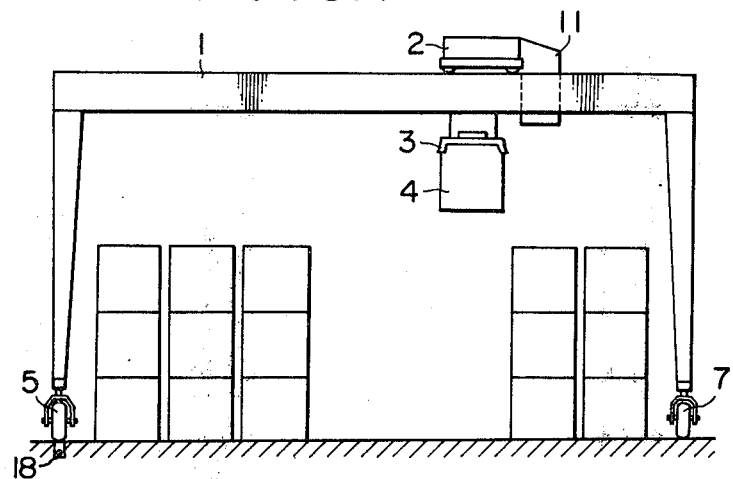
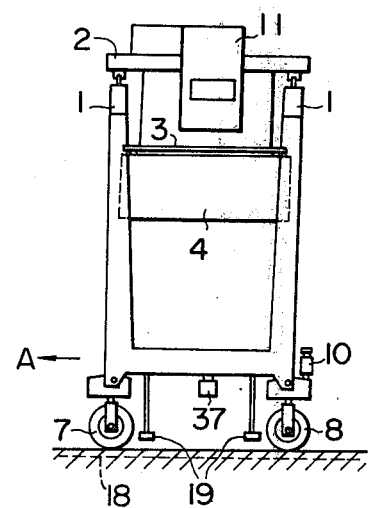
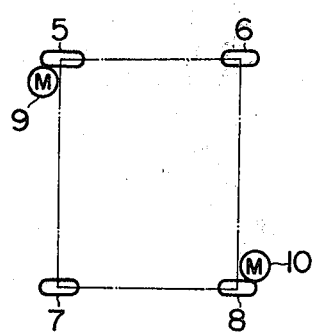
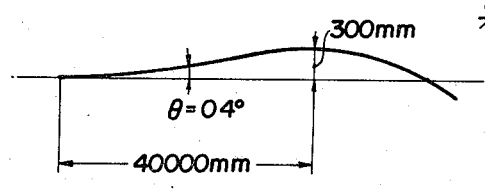
FIG. 1
FIG. 2
FIG. 5
FIG. 4

RUNNING TRACK CONTROL APPARATUS FOR TRACKLESS MOVING BODY

BACKGROUND OF THE INVENTION

1. Field of the Invention

This invention relates to an apparatus which controls the running direction of a trackless moving body adapted to make running movement along a guide wire so that it can be accurately guided to run along the guide wire.

2. Description of the Prior Art

A transfer crane supported to run with rubber tyres as shown in FIG. 1 is known as an example of a trackless moving body. This transfer crane is used as a cargo-handling machine which hoists and carries a container in a container yard or terminal.

The crane of this kind includes a trolley 2 capable of making traversing movement on a pair of girders 1, and a spreader 3 vertically movably suspended from the trolley 2 for releasably grasping a container 4. Rubber tyres 5, 6, 7 and 8 are mounted on the lower ends of the four legs respectively of the transfer crane shown in FIG. 1. These tyres 5 to 8 are arranged at four relative positions as shown in FIG. 2. The rubber tyre 5 is driven for rotation by a motor 9, and the rubber tyre 8 is driven for rotation by another motor 10. The remaining rubber tyres 6 and 7 are idlers with no connection to such driving motors.

The transfer crane is arranged to run along a straight path when the two motors 9 and 10 are simultaneously driven at the same rotation speed. The running direction of the transfer crane can be changed so that it can run leftward or rightward from the straight path when one of the two motors 9 and 10 is deenergized or when the rotation speed of one of the two motors 9 and 10 is made higher or lower than that of the other. The transfer crane can thus be steered to run in any desired direction.

Practically, however, the difference between the diameters of the individual rubber tyres 5, 6, 7, 8, the difference between the running resistances and loads imparted to the individual rubber tyres 5, 6, 7, 8 and the unbalance of the operating characteristics of the individual motors 9, 10 have made difficult to run the crane along a straight path in spite of rotation of the two motors 9 and 10 at the same rotation speed. This tendency becomes more marked with the increase in the running speed of the crane. Further, when a crane operator sits in an operator's box 11 annexed to the trolley 2 to control the running movement of the crane, he must also control the traversing movement of the trolley 2 and vertical movement of the spreader 3, and his burden is quite heavy in both the physical aspect and the mental aspect. A skilled operator has therefore been required for the successful control of the crane operation.

However, it has become more and more difficult to obtain such a skilled crane operator in recent years, and it has been strongly demanded to furnish the crane of this kind with a function of automatic steering control so that the crane can be automatically guided to run along a straight path or track.

In Japanese Utility Model Publication No. 53-39007 published on Sept. 21, 1978, there is disclosed a control apparatus which is applicable to the crane of the kind above described so that the crane can be automatically controlled to run along a straight path.

In the above control apparatus, as shown in FIG. 3, the two drive motors 9 and 10 are connected to a common generator 12, and the current supplied to one of the field windings 13 and 14 of the respective motors 9 and 10 is changed by short-circuiting a part of associated field resistor 13a or 14a through a relay contact 33a or 34a as mentioned hereinafter, thereby to attain the desired automatic steering control. For the purpose of running speed control, a voltage command signal is applied from a controller 15 to a control unit 16, and an output signal from the control unit 16 is applied to a thyristor 17 to vary the field current of the generator 12, so that the output voltage of the generator 12 can be varied in a stepless fashion thereby changing the rotation speed of the two motors 9 and 10. For the purpose of steering control, a guide wire 18 is previously buried in the ground surface GL, and a very weak current at a frequency of the order of several kHz is continuously supplied to this guide wire 18. Antennas 19 are mounted on the crane as a means for sensing this very weak current flowing through the guide wire 18. The sensor output signals pass through a detector circuit 20, a rectifier circuit 21 and a differential amplifier circuit 22 to appear as a position deviation output signal 23 which is applied to a steering control circuit 35. Thus, the antennas 19, detector circuit 20, rectifier circuit 21 and differential amplifier circuit 22 constitute a position deviation sensor unit 36. In the steering control circuit 35, this position deviation signal 23 is differentiated by the primary or the first order differentiation circuit 24 to obtain a primary differentiation signal 25, and this primary differentiation signal 25 is then differentiated by a secondary differentiation circuit 26 to obtain the secondary or the second order differentiation signal 27. Then, the position deviation signal 23, primary differentiation signal 25 and secondary differentiation signal 27 are applied to an adder 31 through respective signal amplifiers 28, 29 and 30. The output signal from the adder 31 is applied to a dead-zone comparator 32 connected to a pair of relays 33 and 34 for correcting any steering error, the relay 33 has a relay contact 33a for changing the field current of the motor 9, and the relay 34 has a relay contact 34a for changing the field current of the motor 10. Any one of the relays 33 and 34 is turned on and off to change the effective value of the field resistor thereby changing the field current of the motor 9 or 10 thereby correcting the steering error. In this manner, the running track of the transfer crane is corrected to follow the guide wire 18.

According to the principle of steering error correction above described, the control output S is given by $$S = D - V\theta - Vw$$

where D is the amount of crane position deviation, V is the running speed of the crane, $\theta$ is the angle of crane position deviation relative to the guide wire 18, and w is the angular velocity of the crane position deviation. The value of $V\theta$ is calculated by the primary differentiation of the amount D of crane position deviation, and the value of Vw is calculated by the secondary differentiation of $V\theta$. However, due to the fact that the period of variation in the crane position deviation is practically quite long, and both the angle $\theta$ and the angular velocity w are very small as shown in FIG. 4, the amplifiers 29 and 30 connected to the outputs of the respective differentiation circuits 24 and 26 had to have a very large amplification degree in order to successfully find the values of Vθ and Vw.

Further, in view of the fact that the differentiation circuits 24 and 26 tend to produce oscillations even in their steady state, the requirement for such an increase in the amplification degree of the amplifiers has resulted in a more complex circuit structure. Furthermore, a filter circuit for filtering the position deviation signal 23 has been required because direct application of this signal, which includes noise components of 1 to 10 Hz, to the differentiation circuit 24 results in appearance of an erroneous steering error correction signal at the output of the steering control circuit 35.

SUMMARY OF THE INVENTION

It is therefore a primary object of the present invention to provide an improved apparatus of the kind above described in which safety means are provided for preventing appearance of an erroneous steering error correction signal at the output of the steering control circuit in spite of the fact that the structure of the steering control circuit in the prior art apparatus is simplified.

In accordance with the present invention, there is provided an apparatus for controlling the running track of a trackless moving body comprising a guide wire, a position deviation sensor unit mounted on the trackless moving body for sensing a deviation of the position of the moving body relative to the guide wire, a steering control circuit electrically connected to the position deviation sensor unit, and steering drive means electrically connected to the steering control circuit for steering the moving body, wherein the steering control circuit comprises a first-order lag circuit connected to the position deviation sensor unit to receive the output signal from the position deviation sensor unit, a subtractor connected to the position deviation sensor unit and to the first-order lag circuit to receive the output signal from the position deviation sensor unit and the output signal from the first-order lag circuit, and a comparator connected to the subtractor to receive the output signal from the subtractor.

BRIEF DESCRIPTION OF THE DRAWINGS

FIG. 1 is a schematic front elevation view of a transfer crane supported to run with rubber tyres and used exclusively for handling containers.

FIG. 2 is a schematic plan view showing the arrangement of the four rubber tyres and two drive motors in the transfer crane shown in FIG. 1.

FIG. 4 illustrates how the running track of the transfer crane is corrected with the movement of the transfer crane.

FIG. 5 is a schematic side elevation view of the transfer crane provided with an embodiment of the apparatus according to the present invention.

DESCRIPTION OF THE PREFERRED EMBODIMENTS

A preferred embodiment of the running track control apparatus according to the present invention will now be described with reference to its application to the transfer crane described already by reference to FIGS. 1 and 2.

Figure 3:
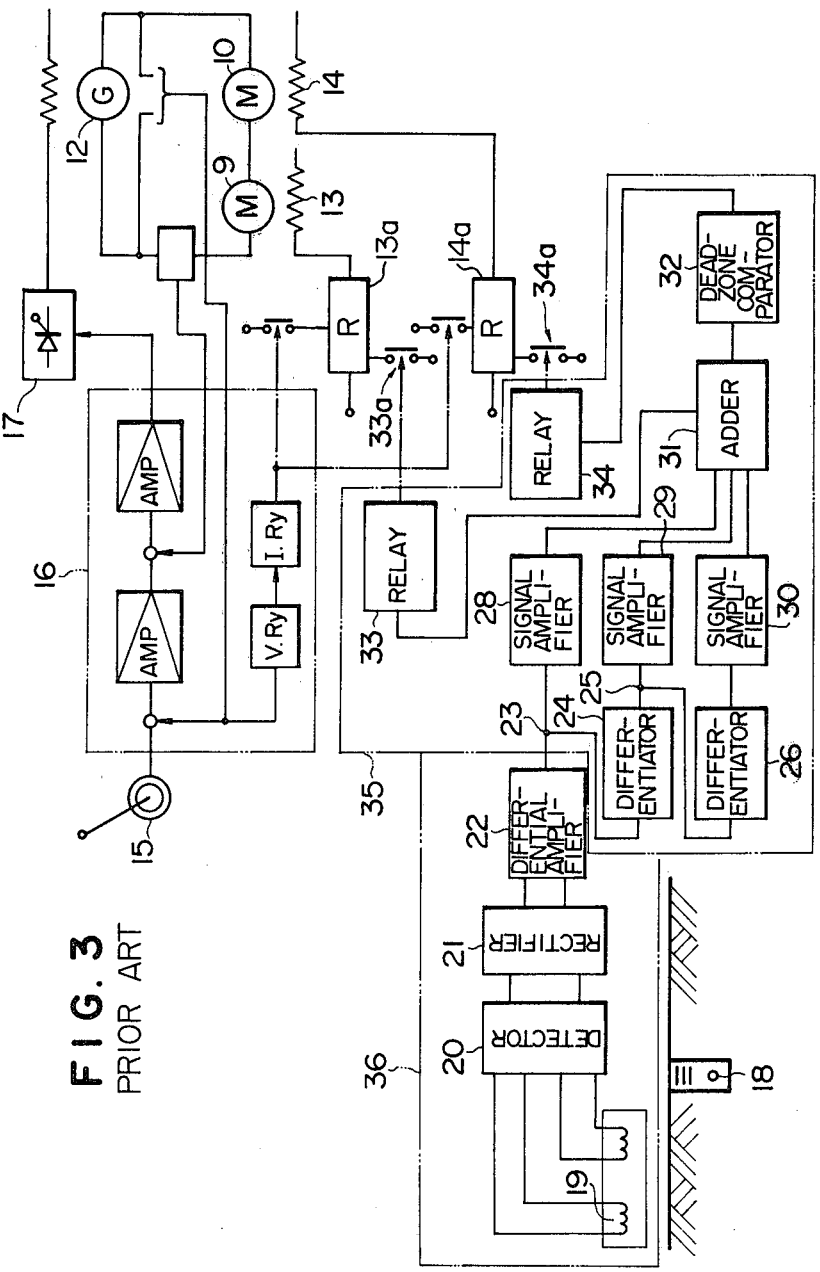
FIG. 3 is a block diagram of an apparatus including a prior art steering control circuit for controlling the drive motors in the transfer crane shown in FIG. 1.

In the embodiment of the present invention, as shown in FIG. 5, a pair of antennas 19 are mounted on the transfer crane in a relation suitably spaced apart from each other in the running direction of the transfer crane shown by an arrow A. These antennas 19 are selectively used in such a manner that the one located on the leading side of the transfer crane in its moving direction is rendered operative in the steering control. Various control circuits including a steering control circuit are housed within a control box 37 shown in FIG. 5. This control box 37 is mounted on the transfer crane. The circuits employed in the embodiment of the present invention for correcting a steering error of the transfer crane are generally similar to the prior art ones shown in FIG. 3 except that the prior art steering control circuit 35 is improved or modified. The modified steering control circuit will now be described in detail with reference to FIG. 6.

Figure 6:
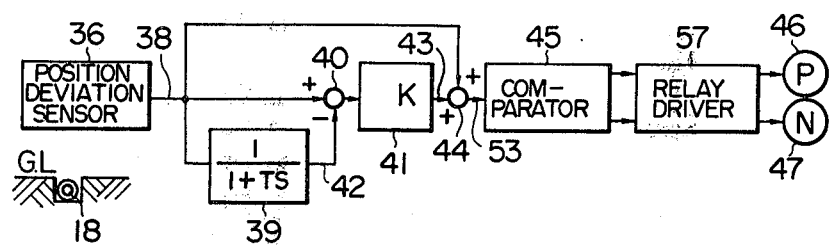
FIG. 6 is a block diagram of the steering control circuit in the embodiment of the present invention.
Figure 7:
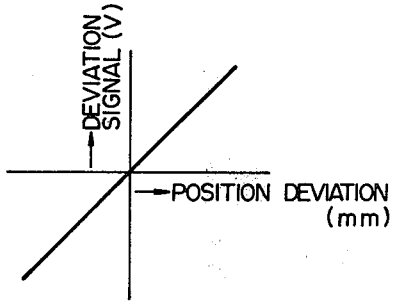
FIG. 7 is a graph showing the relation between the amount of crane position deviation and the position deviation output signal from the position deviation sensor unit in the embodiment of the present invention.

Referring to FIG. 6, a position deviation sensor unit 36 senses the amount of deviation of the position of the transfer crane relative to a guide wire 18 buried in the ground surface GL, and a position deviation output signal 38 appears from the position deviation sensor unit 36. FIG. 7 shows the relation between the amount of crane position deviation and the position deviation signal 38. It will be seen in FIG. 7 that the position deviation signal 38 is proportional to the amount of crane position deviation.

Figure 8:
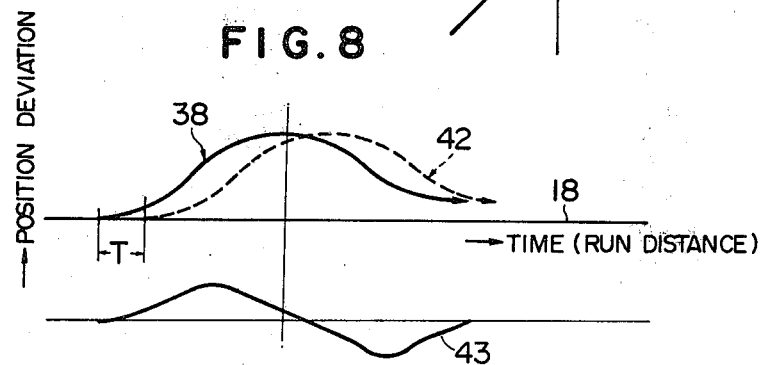
FIG. 8 shows waveforms of various signals appearing in the embodiment of the present invention to illustrate the relation between the amount of crane position deviation and the distance run by the transfer crane.

The position deviation output signal 38 from the position deviation sensor unit 36 is applied to a first-order lag circuit 39, and an output signal 42 appears from the first-order lag circuit 39 in which T is a first-order lag time and s is an operator in Laplace transformation. The output signal 42 from the first-order lag circuit 39 is subtracted from the position deviation output signal 38 in a subtractor 40, and an output signal representing the result of subtraction appear from the subtractor 40 to be applied to an amplifier 41 which amplifies the input by the factor of K. Consequently, the output signal 43 from the amplifier 41 is indicative of the rate of variation of crane position deviation during a given period of time determined according to the first-order lag time T, and this rate of variation provides a factor representing the direction or angle of attitude of the transfer crane relative to the guide wire 18. FIG. 8 shows the relation between the position deviation output signal 38 from the position deviation sensor unit 36 and the output signal 42 from the first-order lag circuit 39, and it will be seen in FIG. 8 that the signal 42 has a waveform which is delayed from that of the signal 38 by the first-order lag time constant T seconds. Thus, when the difference between the signals 38 and 42 is amplified by the factor-of-K amplifier 41, its output signal 43 has a waveform as shown in the lower part of FIG. 8. This signal waveform 43 indicates the direction or angle of attitude of the transfer crane relative to the guide wire 18. The position deviation output signal 38 from the position deviation sensor unit 36 and the output signal 43 from the amplifier 41 are added in an adder 44, and the adder output signal 53 representing the result of addition is applied to a comparator 45 to be compared with a reference level. When the level of the input signal 53 to the comparator 45 is higher than the reference level, the comparator 45 applies its output signal to a relay driver circuit 57 to energize a relay (P) 46 or a relay (N) 47 thereby switching over the field current of the drive motor 9 or 10 for correcting the steering error.

It will be seen that, in the embodiment of the present invention, the factor of angle or direction in movement of the crane relative to the guide wire 18 is monitored to detect the begining of deviation of the crane position so that the steering error can be automatically corrected as soon as it is sensed. With the factor of angle only, it is unable to obtain the signal for correcting the steering error by causing the transfer crane to approach toward the guide wire 18, when the transfer crane runs in parallel with the guide wire 18 while keeping a considerably large distance from the guide wire 18. This is because no factor of angle is detected in such a case. To obviate such a trouble, the position deviation output signal 38 from the position deviation sensor unit 36 is added in the adder 44 to the output signal 43 from the amplifier 41 in the embodiment of the present invention so that the steering error can be corrected on the basis of the output signal from the comparator 45 even when the factor of angle is not appreciable or is not utterly detected although the amount of crane position deviation is large, as when the transfer crane runs in parallel with the guide wire 18 while keeping a large distance therefrom.

Figure 9:
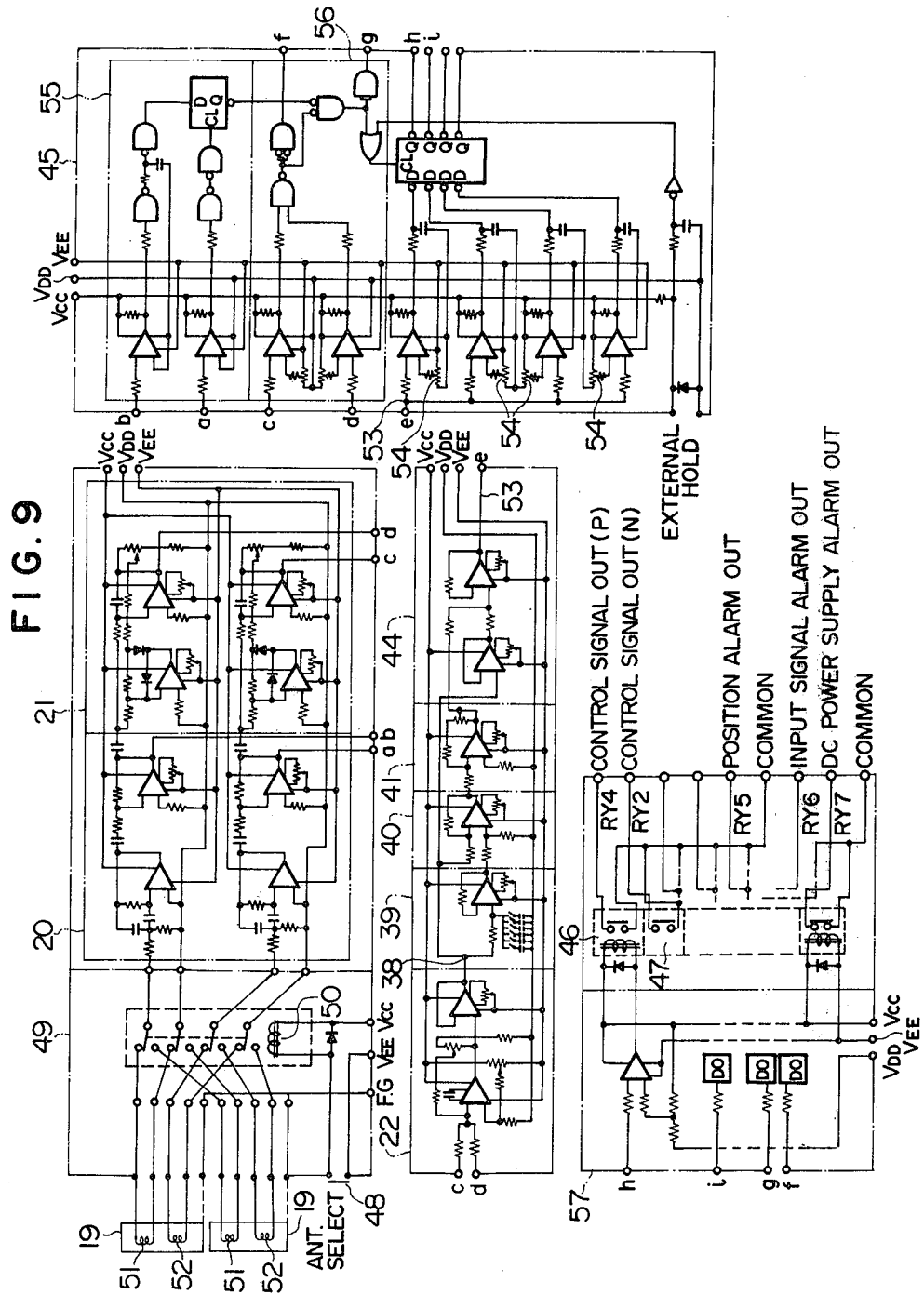
FIG. 9 is a circuit diagram showing the practical structure of one form of the steering control circuit in the embodiment of the present invention.

FIG. 9 shows the detailed practical structure of the individual blocks constituting the steering control circuit shown in FIG. 6, and the practical circuit structure will be described with reference to FIG. 9. Referring to FIG. 9, the antennas 19 are provided for sensing the magnetic field produced by the guide wire 18, and a signal indicative of the forward or backward running of the transfer crane is applied to an antenna select terminal 48 so that the antenna 19 lying on the leading side of the transfer crane in its moving direction can only be selected. When the antenna select terminal 48 is turned on, a relay 50 in an antenna select circuit 49 is energized to select the antenna 19 lying on the advancing side of the transfer crane relative to the other. The antenna 19 includes a pair of coils 51 and 52, and the signals induced in these coils 51 and 52 by sensing the magnetic field produced by the guide wire 18 are independently applied to the associated detectors in the detector circuit 20 respectively. The output signals from the detectors in the detector circuit 20 have the same frequency component as the current flowing through the guide wire 18. The output signals from the detectors in the detector circuit 20 are then applied to the associated rectifiers in the rectifier circuit 21 respectively so that the frequency component of several kHz can be smoothed to provide electrical signals which can be easily electrically processed. The output signals from the repective rectifiers in the rectifier circuit 21 are then applied to the differential amplifier circuit 22 in which the differential between the output signals from the coils 51 and 52 is amplified to provide a position deviation signal 38 as shown in FIG. 8.

The position deviation output signal 38 from the differential amplifier circuit 22 is applied to the first-order lag circuit 39, to the subtractor 40 and to the adder 44. The output signal 42 from the first-order lag circuit 39 is applied to the subtractor 40 in which the output signal 42 from the first-order lag circuit 39 is subtracted from the position deviation output signal 38. The first-order lag error output signal from the subtractor 40 is applied to the factor-of-K amplifier 41 to be amplified therein. The output signal 43 from this amplifier 41 is applied to the adder 44 to be added therein to the position deviation output signal 38 from the differential amplifier circuit 22. The output signal 53 from the adder 44 is applied to the comparator 45. The comparator 45 includes potentiometers 54 for establishing a reference voltage used for comparison. This reference voltage used for comparison is set at a value which is obtained by converting the amount of allowable crane position variation (the maximum allowable distance between the transfer crane and the guide wire 18) into a corresponding voltage. When the level of the output signal 43 from the amplifier 41 representing the factor of angle is high even when the level of the position deviation output signal 38 from the differential amplifier 22 is low, the comparator 45 decides that the level of the adder output signal 53 is higher than that of the reference setting and provides its output signal at the terminal h even when the amount of sensed position deviation lies within the allowable range, since the output signal 53 from the adder 44, which is the voltage to be compared with the reference voltage, represents the result of addition of the position deviation output signal 38 from the differential amplifier 22 and the output signal 43 from the amplifier 41. Conversely, when the level of the position deviation output signal 38 from the differential amplifier 22 is high even when the level of the amplifier output signal 43 representing the factor of angle is low, the comparator 45 decides that the level of the adder output signal 53 is higher than the reference setting and provides its output signal at the terminal h. On the other hand, when the level of the position deviation output signal 38 from the differential amplifier 22 is high and the amplifier output signal 43 representing the factor of angle has a negative high level, no output signal appears from the comparator 45, and any steering error correcting operation is not carried out, since these signals 38 and 43 cancel each other substantially when added, and the level of the resultant signal applied to the comparator 45 is lower than the reference voltage used for comparison.

When the coils 51 and 52 are positioned at opposite sides, respectively, with respect to a vertical plane including the center line of the guide wire, the magnetic fluxes interlinking with the coils 51 and 52 are in opposite phase-relationship with each other, while when the coils 51 and 52 are positioned at the same side with respect to the veritcal plane, the magnetic fluxes will be in the same phase. The signals derived from the coils 51 and 52 and representative of the magnetic fluxes thereof are applied through the detector circuit 20 to a comparator unit 55 which is arranged to produce an alarm signal at the terminal g when they are in the same phase. Further, when the levels of the output signals from the rectifiers in the rectifier circuit 21 are very low, no current will be flowing through the guide wire 18, and the automatic steering control will become impossible in such a case. To obviate such a trouble, the comparator 45 includes another comparator section 56 which energizes an alarm relay for producing an alarm signal when the levels of the output signals from the respective rectifiers in the rectifier circuit 21 are both very low.

The output signal from the comparator 45 is applied to the relay driver circuit 57 connected to the relays 46 and 47 for selectively switching over the field current of the motors 9 and 10 respectively. Therefore, when the comparator 45 delivers its output signal at terminal h or i, the relay 46 or 47 is turned on, respectively. The output signals from the comparator sections 55 and 56 are similarly applied to the relay driver circuit 57 to energize the associated alarm relays respectively.

The apparatus of the present invention comprising such an improved steering control circuit controls the movement of the transfer crane in a manner as described presently.

Figure 10:
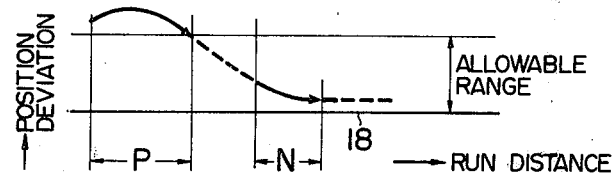
FIGS. 10, 11 and 12 show the relation between the amount of crane position deviation and the distance run by the transfer crane to illustrate how the running track of the crane is corrected according to the embodiment of the present invention in various cases.

FIG. 10 illustrates, by way of example, that the transfer crane starts to run with a large amount of position deviation and also with a large angle of attitude, in which the curve indicates the running track of the tyre with a portion shown by a solid line where the steering correction control is carried out and another portion shown by a dotted line where no steering correction control is carried out. When the position deviation output signal 38 and the output signal 43 of the amplifier 41 are at positive, and hence the output 53 of the adder 44 is larger than the reference voltage level set by the potentiometer 54, the comparator 45 produces its output at the terminal h, which in turn actuates the relay (P) 46 so that the field current is controlled in the above-mentioned manner so as to steer the crane toward the guide wire 18. As a result, the output signal 38 initially diverged away from the guide wire 18 changes to gradually approach the guide wire 18 under the steering correction control. After passing the maximum deviation point, the output signal 43 from the amplifier 41 turns negative from positive so that the adder 44 acts to subtract the amplifier output signal 43 from the position deviation output signal 38. Finally, a balance is reached between the position deviation output signal 38 and the amplifier output signal 43 so that the output 53 of the adder 44 is rendered smaller than the reference voltage level set by the potentiometer 54, and therefore the comparator 45 ceases to produce its output at the terminal h thereby releasing the relay (P) 46 and terminating the steering correction operation. However, the continued movement of the crane with no steering correction control will result in an increase in the negative level of the output signal 43 from the amplifier 41 due to the large initial angle of attitude, while decreasing the positive level of the position deviation signal due to approaching the guide wire 18. Therefore, the output 53 of the adder takes a negative value larger than the negative reference voltage level set by a potentiometer 54 thereby causing the comparator to produce an output at the terminal i, and actuating the relay (N) 47. As a result, the field control is carried out so as to decrease the angle of attitude relative to the guide wire 18. Finally, both the output of the amplifier 41 and the position deviation signal 38 become smaller to cease the output from the comparator 45, thereby terminating the steering correction control in any direction.

Figure 11:
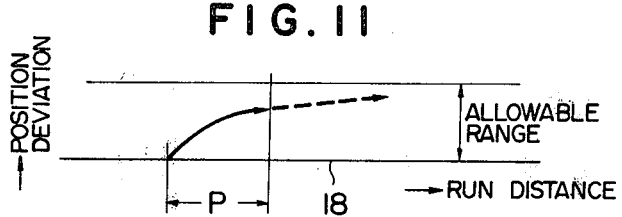

FIG. 11 illustrates that the crane starts to run in a direction in which it moves away from the guide wire 18 at a large angle of attitude although it has not initially any position deviation. In such a case, the amplifier output signal 43 has a high positive level, and the relay (P) 46 is energized for correcting the steering error. When the result of automatic steering control decreases the angle of attitude relative to the guide wire 18 to less than a predetermined value, the level of the position deviation output signal 38 is lowered, and the energization of the relay (P) 46 ceases to release the automatic steering control on the crane.

Figure 12:
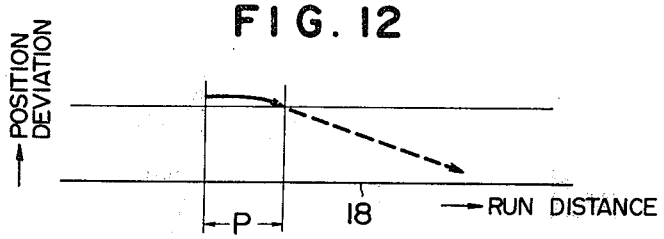

FIG. 12 illustrates another case in which the crane starts to run with a large amount of position deviation but at a small angle of attitude, that is, the crane runs substantially in parallel with the guide wire 18. In such a case, the position deviation output signal 38 has a high positive level, and the output signal from the comparator 45 acts to energize the relay (P) 46 so as to correct the steering error. Approaching movement of the crane by a small distance toward the guide wire 18 decreases the amount of crane position deviation to within the range of allowable position deviation, and the automatic steering control on the crane ceases.

It will be understood from the foregoing detailed description of the embodiment of the present invention that the elimination of the primary and secondary differentiation circuits can obviate the prior art defect which is the tendency of oscillations of such differentiation circuits. Further, the present invention can easily satisfy the prior art requirement for improvement in the amplification degree of the amplifiers by merely varying the first-order lag time constant T of the first-order lag circuit. Therefore, the control apparatus is simpler in structure and less expensive than the prior art apparatus in which the primary and secondary differentiation circuits must be provided in combination. Further, the control apparatus of the present invention including the first-order lag circuit is advantageous over the prior art one including such differentiation circuits in that the control operation is not adversely affected by noise components of the order of 1 Hz to 10 Hz, and the apparatus is free from any mal-function due to such noise components.

Figure 13:
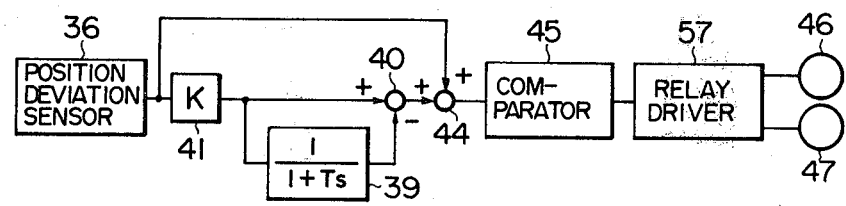
FIG. 13 is a block diagram of the steering control circuit in another embodiment of the present invention.
Figure 14:
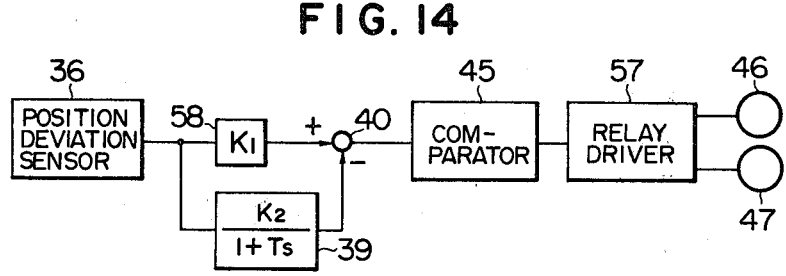
FIG. 14 is a block diagram of the steering control circuit in still another embodiment of the present invention.

These advantages can also be achieved by other forms of the steering control circuit shown in FIGS. 13 and 14, and the embodiments including these steering control circuits are also included in the scope of the present invention.

The steering control circuit shown in FIG. 13 is a modification of that shown in FIG. 6 in that the factor-of-K amplifier 41 is connected between the position deviation sensor unit 36 and the first-order lag circuit 39. Another such amplifier 41 may be additionally provided or the amplifier 41 may be disposed in a different position.

The steering control circuit shown in FIG. 14 is another modification of that shown in FIG. 6 in that the adder 44 in FIG. 6 is eliminated, and a factor-of-$K_1$ amplifier 58 is provided to amplify the position deviation output signal 38 which is to be applied to the subtractor 40. In FIG. 14, the first-order lag circuit 39 has an additional function of amplification by the factor of $K_2$.

In each of the embodiments shown in FIGS. 13 and 14, the amplifier constant may be suitably determined to suit the purpose of automatic steering control.

All of the aforementioned embodiments are of the type adapted to correct the steering error by switching over the field current of the motors 9 and 10 by the associated relays 46 and 47 respectively. However, when a thyristor is used for the stepless control of the field circuit of each of the motors 9 and 10, the output signal 53 from the adder 44 shown in FIG. 6 may be applied to a thyristor control circuit for selectively controlling the field current of the individual motors 9 and 10 in a stepless mode. Such an embodiment is also included in the scope of the present invention.

In the aforementioned embodiments, the comparator decides the mode of steering error correction on the basis of the factor of angle, that is, the factor indicative of the running direction of the crane, and the factor of deviation of the crane position from the guide wire, that is, the factor indicative of the amount of crane position deviation. However, the factor indicative of the initial running direction of the crane may only be actually detected, and the later running direction of the crane may be predicted to correct the steering error. In such a modification, the factor indicative of the amount of crane position deviation is unnecessary, and the adder 44 in the steering control circuit is also unnecessary.

In each of the aforementioned embodiments, the subtractor 40 may also be realized by the combination of an adder and a signal inverter, and the adder 44 may also be realized by the combination of a subtractor and a signal inverter.

We claim:

1. An apparatus for controlling the running track of a trackless moving body comprising a guide wire, a position deviation sensor unit mounted on the trackless moving body for sensing a deviation of the position of the moving body relative to said guide wire, a steering control circuit electrically connected to said position deviation sensor unit, and steering drive means electrically connected to said steering control circuit, for steering the moving body, wherein said steering control circuit comprises a first-order lag circuit connected to said position deviation sensor unit to receive the output signal from said position deviation sensor unit, a subtractor connected to said position deviation sensor unit and to said first-order lag circuit to receive the output signal from said position deviation sensor unit and the output signal from said first-order lag circuit, and a comparator connected to said subtractor to receive the output signal from said subtractor.

2. An apparatus as claimed in claim 1, wherein said steering control circuit further comprises an adder connected between said subtractor and said comparator for adding the output signal from said position deviation sensor unit and the output signal from said subtractor and applying the resultant signal to said comparator.

3. An apparatus as claimed in claim 2, wherein said steering control circuit further comprises an amplifier connected between said adder and said subtractor for amplifying the output signal from said subtractor and applying the resultant signal to said adder.

* * * * *